(12) United States Patent
Gaddam et al.

(10) Patent No.: US 11,451,371 B2
(45) Date of Patent: Sep. 20, 2022

(54) DATA MASKING FRAMEWORK FOR INFORMATION PROCESSING SYSTEM

(71) Applicant: Dell Products L.P., Round Rock, TX (US)

(72) Inventors: Sunil Kumar Gaddam, Austin, TX (US); Dennis Wayne Tagliabue, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 355 days.

(21) Appl. No.: 16/668,869

(22) Filed: Oct. 30, 2019

(65) Prior Publication Data

US 2021/0135838 A1    May 6, 2021

(51) Int. Cl.
*H04L 9/06* (2006.01)
*G06F 16/27* (2019.01)

(52) U.S. Cl.
CPC .............. *H04L 9/06* (2013.01); *G06F 16/27* (2019.01); *H04L 2209/043* (2013.01); *H04L 2209/16* (2013.01)

(58) Field of Classification Search
CPC . H04L 9/06; H04L 2209/043; H04L 2209/16; H04L 9/065; H04L 9/14; H04L 9/0643; G06F 16/27; G06F 21/6254; G06F 21/6209; G06F 21/6227; G06F 21/6245
See application file for complete search history.

(56) References Cited

U.S. PATENT DOCUMENTS

| | | | |
|---|---|---|---|
| 6,443,556 B1 * | 9/2002 | Garcia | H04N 1/1906 347/14 |
| 7,343,578 B1 * | 3/2008 | Patterson | G06F 30/30 716/121 |
| 7,395,528 B1 * | 7/2008 | Cantrill | G06F 11/3636 717/130 |
| 7,480,898 B2 * | 1/2009 | Batten | G06F 11/3672 717/124 |
| 7,890,916 B1 * | 2/2011 | Donlin | G01R 31/318519 716/108 |
| 7,974,942 B2 * | 7/2011 | Pomroy | G06F 21/6245 707/610 |
| 8,209,549 B1 * | 6/2012 | Bain, III | G06Q 20/382 705/64 |
| 8,479,143 B1 * | 7/2013 | Baeckler | G06F 30/327 716/135 |

(Continued)

OTHER PUBLICATIONS

Delphix, "Delphix Data Masking," https://www.delphix.com/sites/default/files/2018-03/WEB_Datasheet_DataMasking_0318.pdf, 2018, 2 pages.

(Continued)

*Primary Examiner* — David Garcia Cervetti
(74) *Attorney, Agent, or Firm* — Ryan, Mason & Lewis, LLP (57) ABSTRACT

Techniques for improved masking data in an information processing system are provided. For example, a method comprises generating a data masking configuration file for use in an information processing system to mask at least a portion of a given data set, wherein the generation of the data masking configuration file further comprises attaching a masking algorithm function selected from a plurality of defined masking algorithm functions to each data element of the given data set to be masked.

20 Claims, 10 Drawing Sheets

(56) References Cited

U.S. PATENT DOCUMENTS

| | | | | |
|---|---|---|---|---|
| 8,606,626 B1* | 12/2013 | DeSoto | G06Q 30/0269 | 705/7.29 |
| 8,997,033 B1* | 3/2015 | Hew | G06F 30/30 | 716/117 |
| 9,223,709 B1* | 12/2015 | O'Bleness | G06F 12/0864 | |
| 9,349,026 B2* | 5/2016 | Gianniotis | H04L 63/0407 | |
| 9,489,354 B1* | 11/2016 | Lee | G06F 21/6245 | |
| 9,613,227 B1* | 4/2017 | Kothari | G06F 21/602 | |
| 9,658,797 B1* | 5/2017 | Elliott, IV | G06F 11/1464 | |
| 9,684,566 B2* | 6/2017 | Li | G06F 16/284 | |
| 9,747,168 B2* | 8/2017 | Haustein | G06F 11/1451 | |
| 9,792,431 B1* | 10/2017 | Dalal | G06F 12/14 | |
| 9,875,329 B1* | 1/2018 | Todi | G06F 30/39 | |
| 9,965,648 B1* | 5/2018 | Cheng | H04L 9/0643 | |
| 10,242,000 B2* | 3/2019 | Antonatos | G06F 16/00 | |
| 10,373,134 B1* | 8/2019 | Dachepalli | G06Q 20/401 | |
| 11,120,163 B2* | 9/2021 | Tawakol | G06Q 30/0254 | |
| 11,176,092 B2* | 11/2021 | Isoda | G06F 21/6254 | |
| 2002/0095405 A1* | 7/2002 | Fujiwara | G06F 21/6227 | |
| 2005/0144176 A1* | 6/2005 | Lei | G06F 16/24553 | |
| 2005/0198074 A1* | 9/2005 | Khayter | G06F 16/27 | |
| 2006/0051687 A1* | 3/2006 | Ito | G03F 1/84 | 430/30 |
| 2007/0103685 A1* | 5/2007 | Harding | G01B 11/2513 | 356/394 |
| 2007/0110224 A1* | 5/2007 | Gumpel | G06F 21/6245 | 380/28 |
| 2007/0130106 A1* | 6/2007 | Gadiraju | G06F 21/6218 | |
| 2007/0250805 A1* | 10/2007 | Wang | G03F 1/84 | 716/52 |
| 2008/0065665 A1* | 3/2008 | Pomroy | G06F 16/20 | |
| 2008/0120554 A1* | 5/2008 | Xu | G03F 1/68 | 715/742 |
| 2008/0133934 A1* | 6/2008 | Gopinath | G06F 11/3672 | 713/189 |
| 2009/0049511 A1* | 2/2009 | Manickam | G06F 21/6254 | 726/1 |
| 2009/0049512 A1* | 2/2009 | Manickam | H04L 63/0407 | 726/1 |
| 2009/0100527 A1* | 4/2009 | Booth | G06F 21/6254 | 726/27 |
| 2009/0271361 A1* | 10/2009 | Pattabhi | G06F 16/217 | |
| 2009/0281974 A1* | 11/2009 | Saxena | G06N 3/0427 | 706/14 |
| 2010/0030795 A1* | 2/2010 | Pattabhi | G06F 21/6227 | 707/757 |
| 2010/0141925 A1* | 6/2010 | Cao | G03F 7/705 | 355/77 |
| 2010/0205189 A1* | 8/2010 | Ebrahimi | G06F 21/62 | 707/804 |
| 2011/0113050 A1* | 5/2011 | Youn | G06F 21/6218 | 707/E17.124 |
| 2011/0314300 A1* | 12/2011 | Taskaya | H04L 9/085 | 713/189 |
| 2011/0321120 A1* | 12/2011 | Saxena | G06F 21/6245 | 726/1 |
| 2012/0030165 A1* | 2/2012 | Guirguis | G06F 9/466 | 707/E17.007 |
| 2012/0197919 A1* | 8/2012 | Chen | G06F 16/221 | 707/E17.005 |
| 2012/0246696 A1* | 9/2012 | Boukobza | G06F 21/6245 | 726/1 |
| 2012/0259877 A1* | 10/2012 | Raghunathan | G06F 21/6254 | 707/757 |
| 2012/0311557 A1* | 12/2012 | Resch | G06F 3/0604 | 717/171 |
| 2013/0060820 A1* | 3/2013 | Bulusu | G06F 21/6254 | 707/802 |
| 2013/0080398 A1* | 3/2013 | Booth | G06F 21/6254 | 707/687 |
| 2013/0144901 A1* | 6/2013 | Ho | G06F 16/248 | 707/769 |
| 2013/0262146 A1* | 10/2013 | Price | G16H 10/60 | 705/3 |
| 2013/0268920 A1* | 10/2013 | Ursal | G06F 8/70 | 717/131 |
| 2013/0282679 A1* | 10/2013 | Khin | G06F 16/258 | 707/698 |
| 2013/0282697 A1* | 10/2013 | Barbas | G06F 16/24553 | 707/722 |
| 2014/0164405 A1* | 6/2014 | Tsai | G06F 21/6227 | 707/754 |
| 2015/0067881 A1* | 3/2015 | Badstieber | G06F 16/13 | 726/26 |
| 2015/0067886 A1* | 3/2015 | Maman | G06F 16/2443 | 726/27 |
| 2015/0082449 A1* | 3/2015 | Mushkatblat | G06F 21/6254 | 726/26 |
| 2015/0113659 A1* | 4/2015 | D'Costa | G06F 16/00 | 726/26 |
| 2015/0256520 A1* | 9/2015 | Maier | G06F 21/6218 | 713/168 |
| 2015/0324607 A1* | 11/2015 | Mushkatblat | G06F 21/6245 | 726/26 |
| 2016/0034481 A1* | 2/2016 | Kumarasamy | G06F 11/16 | 707/639 |
| 2016/0092535 A1* | 3/2016 | Kuchibhotla | G06F 3/04842 | 707/634 |
| 2016/0224259 A1* | 8/2016 | Ahrens | G06F 3/067 | |
| 2016/0224797 A1* | 8/2016 | Schrock | G06F 16/2358 | |
| 2016/0269417 A1* | 9/2016 | Saxena | H04L 63/06 | |
| 2016/0321339 A1* | 11/2016 | Tekade | G06F 8/76 | |
| 2016/0379010 A1* | 12/2016 | Farkash | G06F 21/6245 | 726/1 |
| 2017/0124341 A1* | 5/2017 | Farkash | G06F 21/606 | |
| 2017/0132420 A1* | 5/2017 | Shetty | G09C 1/04 | |
| 2017/0272504 A1* | 9/2017 | Cahill | G06F 16/22 | |
| 2017/0323119 A1* | 11/2017 | Harp | G06F 3/065 | |
| 2018/0018232 A1* | 1/2018 | Resch | G06F 12/1408 | |
| 2018/0107466 A1* | 4/2018 | Rihani | G06F 9/4856 | |
| 2018/0226157 A1* | 8/2018 | Blanshard | G16H 40/20 | |
| 2019/0026490 A1* | 1/2019 | Ahmed | G06F 21/6254 | |
| 2019/0034467 A1* | 1/2019 | Kwon | G06F 16/2228 | |
| 2019/0095644 A1* | 3/2019 | Park | G05B 15/02 | |
| 2019/0108253 A1* | 4/2019 | Ackermann | G06F 16/2365 | |
| 2019/0377895 A1* | 12/2019 | Sanghi | G06F 21/6254 | |
| 2020/0065520 A1* | 2/2020 | Reed | G06F 16/137 | |
| 2020/0082010 A1* | 3/2020 | Bodziony | G06F 16/256 | |
| 2020/0125667 A1* | 4/2020 | Sonawane | G06F 16/252 | |
| 2020/0143075 A1* | 5/2020 | Piatek | G06F 21/6254 | |
| 2020/0143082 A1* | 5/2020 | Dubishar | G06F 16/221 | |
| 2020/0301917 A1* | 9/2020 | Niu | G06F 21/6218 | |
| 2020/0310921 A1* | 10/2020 | Littlefield | G06F 16/176 | |
| 2020/0311304 A1* | 10/2020 | Parthasarathy | G06F 21/6218 | |
| 2020/0334240 A1* | 10/2020 | Muralidhar | G06F 16/2393 | |

OTHER PUBLICATIONS

Oracle, "Oracle Data Masking and Subsetting Pack," https://www.oracle.com/a/tech/docs/dbsec/dms/oracle-dms-data-sheet-2019.pdf, 2019, 4 pages.

Hewlett Packard Enterprise, "HPE SecureData Enterprise—End-to-End Data-Centric Security for the Way Your Business Works," https://www.uk.sogeti.com/globalassets/uk/guides/hpe-securedata-enterprise.pdf, Nov. 2015, 4 pages.

CA Technologies, "CA Virtual Test Data Manager," https://docs.broadcom.com/docs-and-downloads/content/dam/ca/us/files/data-sheet/ca-test-data-manager-vtdm.pdf, 2017, 2 pages.

Dataprof.com, "How to Mask Test Data," https://www.datprof.com/tutorials/how-to-mask-test-data/, Apr. 23, 2019, 5 pages.

* cited by examiner

| | | |
|---|---|---|
| 401 | DATA_MASK_TASK_DETAILS | To capture the number of threads to be spawned |
| 402 | INDEXES_TO_REBUILD | To capture indexes to be rebuilt post masking |
| 403 | TRIGGERS_DISABLED | To capture triggers disabled and re-enable post masking |
| 404 | TABLES_TO_TRUNCATE | To capture tables to be truncated ex.- audit_log tables |
| 405 | DATA_MASK_CONFIG | Configuration table to capture masking details – 1 row per column. This is the only information required from Dev team - data classification doc. |
| 406 | JOBS_DISABLED | To capture jobs detail disabled |
| 407 | DATA_MASK_CONFIG_SEQ | This sequence is used to populate data_mask_config.id |
| 408 | OBJECTS_EXCLUDED_FROM_PROC | To capture object details that can be excluded from processing. Valid objects - TRIGGER, JOB, TABLE, INDEX, CONSTRAINT |
| 409 | VPD_POLICIES_DISABLED | To capture disabled VPD policies details |
| 410 | DDL_STATEMENTS | To capture DDL statements for Constraints, Indexes to re-create/rebuild |
| 411 | TABLE_COLUMNS_DEF | This table is used to capture columns definitions for special processing |
| 412 | INDEXES_TO_RECREATE | To capture index details to be re-created |
| 413 | MASK_TRANSLATION_STRINGS | Table to capture TRANSLATION string from and to information. Default values are inserted with the framework |

FIG. 4

| | | |
|---|---|---|
| 501 | REVERSE_CHAR_DATA | To reverse the provided data. This function can be used for NUMBER, CHAR, and VARCHAR datatypes. Supports both English and Non-English characters. Ex:- SMITH shall be masked as HTIMS |
| 502 | SHUFFLE_CHAR_DATA | To shuffle the provided data. This function can be used for NUMBER, CHAR, and VARCHAR datatypes. Supports both English and Non-English characters. |
| 503 | TRANSLATE_ENGLISH_DATA | This function is used to translate NUMBER, CHAR and VARCHAR data types. |
| 504 | MASK_NON_ENGLISH_DATA | This function works to mask non-English characters. By default the characters are Reversed. The other option is Shuffle. Also this function supports if data consists of a combination of English and Non-English characters |
| 505 | TRANSLATE_CLOB_DATA | To mask the provided CLOB data. Underlying uses TRANSLATE function |
| 506 | TRANSLATE_BLOB_DATA | To mask the provided BLOB data. Underlying uses TRANSLATE function |
| 507 | MASK_BYCOLUMN_SHUFFLE | To randomly pick the data from a pre-defined set of values. List of values are generated based on DATA_MASK_CONFIG.SAMPLE_SIZE |
| 508 | MASK_2NDCHAR_ONWARDS | To mask second character and beyond as x |
| 509 | MASK_WITH_NULL | To update with a NULL value |
| 510 | MASK_WITH_EMPTYSTRING | To update with empty string |
| 511 | MASK_EMAIL | To mask email address |

DATA MASKING FRAMEWORK FOR INFORMATION PROCESSING SYSTEM

FIELD

The field relates generally to information processing systems, and more particularly to techniques for masking data in such information processing systems.

BACKGROUND

Data masking (also known as data obfuscation) is a process of hiding original data by replacing the original data with modified content such as, by way of example, characters or other data. The process is applied to data for a number of reasons. For example, sometimes the original data contains classified or private data, personally-sensitive data, and/or commercially-sensitive data. Typically, however, the masked data should remain usable in terms of its appearance and consistency.

For example, assume original data associated with a production system is to be masked. A production system is a part of an information processing system in which one or more application programs are executed online (in real-time) and data associated with the one or more application programs is stored. Compare this to a non-production (offline) system which is a part of an information processing system in which such one or more application programs are developed, modified and/or tested before, contemporaneous with, or after being executed in the production system. In these scenarios, any production data that is masked should still be usable for non-production purposes. Other masking scenarios exist including, but not limited to, a scenario wherein data that appears on terminal screens to call center operators may have masking dynamically applied based on user security permissions. However, masking data that is usable for a wide variety of purposes is a significant challenge.

SUMMARY

Embodiments of the invention provide techniques for improved masking data in an information processing system.

For example, in one embodiment, a method comprises generating a data masking configuration file for use in an information processing system to mask at least a portion of a given data set, wherein the generation of the data masking configuration file further comprises attaching a masking algorithm function selected from a plurality of defined masking algorithm functions to each data element of the given data set to be masked.

Advantageously, inter alia, by attaching a defined masking function for each data element in a data set, illustrative embodiments enable flexible data masking of data elements with complex data relationships. Such flexible data masking provides improved data throughput in any information processing systems that would benefit from masked data that remains usable in terms of its appearance and consistency and that is usable for a wide variety of purposes.

These and other features and advantages of the invention will become more readily apparent from the accompanying drawings and the following detailed description.

DETAILED DESCRIPTION

Illustrative embodiments may be described herein with reference to exemplary information processing systems such as, but not limited to, computing environments, cloud infrastructure, data repositories, data centers, data processing systems, computing systems, data storage systems and associated servers, computers, storage units and devices and other processing and computing devices. It is to be appreciated, however, that embodiments of the invention are not restricted to use with the particular illustrative system and device configurations shown. Moreover, the phrases "information processing system," "cloud environment," "cloud computing platform," "cloud infrastructure," "data repository," "data center," "data processing system," "computing system," "data storage system," "computing environment," and the like as used herein are intended to be broadly construed, so as to encompass, for example, any arrangement of one or more processing devices.

As mentioned above in the background section, masking data that is usable for a wide variety of purposes is a significant challenge, particularly in an information processing system with a production system and a non-production system used for the development, modification and testing of one or more application programs (applications). In such existing scenarios, for each application, a development team works with a project team and provides a masking script that defines what data should be masked with respect to its specific application requirements. Within an enterprise, there are multiple development teams developing multiple applications in conjunction with multiple project teams, wherein the various applications have multiple heterogenous masking requirements. Note that as illustratively used herein, the term "enterprise" refers to a corporation or other business entity. In determining the masking requirements and scripts, there is a significant amount of back and forth conversation between each development team and each project team in an enterprise to resolve issues.

Unfortunately, existing solutions such as the Delphix® Data Masking Engine (Delphix Corporation, Redwood City, Calif.) are not comprehensive enough to solve all or even most of the issues with the masking process. Typical issues include, but are not limited to: an inability to handle complex data relationships (e.g., foreign key relationships); bypass triggers, constraints, indexes; terminate/disable scheduled jobs temporarily; inability to mask data elements with virtual private database (VPD) policies enabled; inability to handle masking encrypted/hidden columns; inability to handle non-partitioned tables with several hundreds of millions to billion records in an efficient way; scalability issues wherein processing very large tables with several billions of records takes significantly long time; inability to take advantage of masking partition/sub-partition effectively; complexity involved with integrating virtual database (VDB) provisioning processes; and masking Extensible Markup Language (XML) data types.

Illustrative embodiments overcome the above and other drawbacks by providing a framework that provides improved data masking capabilities that are usable for a wide variety of purposes. For example, in illustrative embodiments, the framework flexibly supports different masking algorithm functions such as, but not limited to, fixed, shuffle, reverse, translate, etc. Also, a masking algorithm can be attached at a granular level. The framework is configured to disable/enable scheduled jobs/triggers for better performance and throughput, support to mask encrypted and/or VPD policy enabled data elements, and support for mask hidden columns as well as mask columns with unique constraints. Further, in illustrative embodiments, the framework is configured to refresh materialized views related to masked tables. Still further, the framework provides high throughput such that multiple tables and multiple partitions can be masked in parallel based on the database configuration (e.g., seven billion records masked in sixteen hours). Dependent table masking functionality is provided whereby a parent table is masked and then one or more child tables are masked. In addition, the framework is configured to drop/recreate indexes and constraints for better performance. Code adjustments are relatively easy for any database specific scenarios, e.g., refreshing dependent materialized views. The framework is able to cut down the size of data to be masked by excluding null rows through the configuration. Still further, the framework is masking tool independent, and extensibly supports any database configurations, for example, but not limited to Oracle databases, MS SQL databases, MYSQL databases, as well as any relational databases and noSQL databases.

Figure 1:
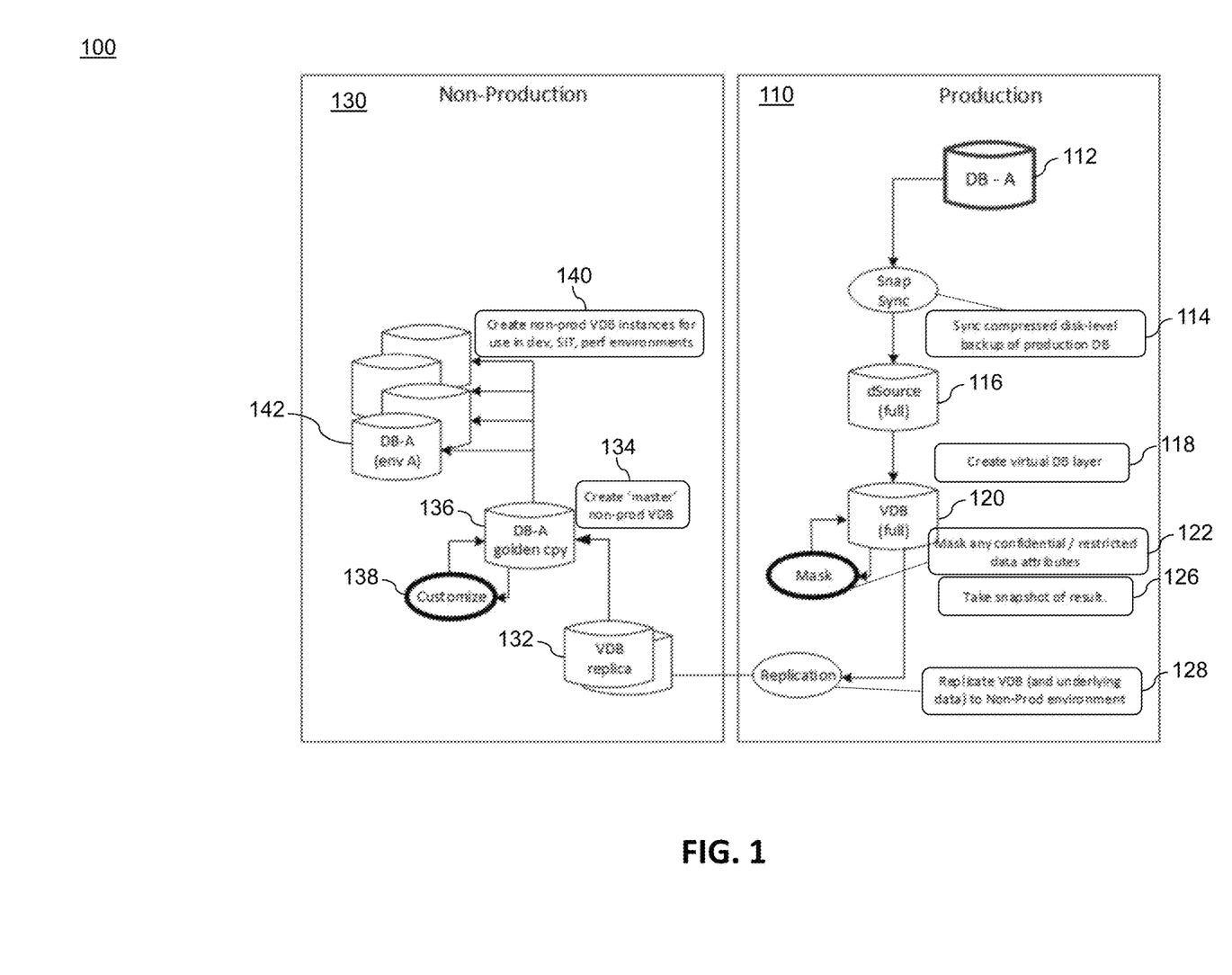
FIG. 1 depicts an information processing system with data masking, according to an embodiment.

FIG. 1 depicts an information processing system with data masking, according to an embodiment of the invention. More particularly, as shown, information processing system 100 comprises a production system 110 operatively coupled to a non-production system 130. Recall, as explained above, that a production system is where one or more application programs associated with an enterprise are executed online/real-time and data associated with the one or more application programs is stored, while a non-production (offline) system is where the one or more applications programs are developed, modified and tested before, contemporaneous, and/or after with being executed in the production system.

Assume a database 112, denoted as DB-A in FIG. 1, is stored on the production system 110. DB-A can be any type of database that operates in conjunction with one or more applications executing in real-time on production system 110. DB-A is therefore referred to as the production database.

Step 114 comprises performing a synchronized compressed disk-level backup of DB-A. This is referred to as a "snap sync". The term "snap" referring to a snapshot of the production database. In one or more illustrative embodiments, a database snapshot is a read-only, static view of a source database (e.g., DB-A). The database snapshot is typically transaction-consistent with the source database as of the moment (time instance) of the creation of the snapshot. A database snapshot typically resides on the same system (e.g., server) instance as its source database. The database snapshot that results from the snap sync operation is shown in FIG. 1 as dSource (full) 116. The term "full," as illustratively used herein, refers to a complete recovery manager-level backup of the source database inclusive of all data blocks in the data files of the source database as well as archive logs. The snap sync operation in step 114 can be repeated to capture incremental updates to the snapshot of the production database.

More specifically, dSource is an object that is a virtualized representation of a database that is used to create and update virtual copies of the database. As a virtualized representation of the source data, it cannot be managed, manipulated, or examined by database tools. Because dSources are simply source data, a VDB is provisioned (see step 118 below) in order to distribute/clone/test the data being pulled in. VDBs can also later be refreshed from the same or other points in time synced from the dSource.

In step 118, a virtual database snapshot, VDB (full) 120, is created from the database snapshot 116. A VDB comprises the file system snapshot blocks associated with the changes captured in the snap sync operation(s) in step 114 and the blocks that have not changed between this snapshot and the original snapshot taken at the time of creation of database snapshot 116. More specifically, VDB is a database provisioned from either a dSource or another VDB which is a full read/write copy of the source data.

Step 122 masks any confidential and/or restricted data in the VDB 120. Note that step 122 is described in further detail below in the context of FIGS. 3A through 3D.

In step 126, a snapshot of the resulting masked database (masked VDB 120) is taken. Recall that snapshots represent the state of a dataset at a specific moment in time. They accumulate over time from policies or are generated by manual creation. Snapshots allow for a system or person to choose a point in time from which to provision, refresh, or rollback. In this case, the system takes a snapshot of the resulting database (masked VDB) which represents the masked dataset.

Step 128 replicates the masked VDB (and underlying data) and sends the replica to the non-production system 130. Underlying data refers to the data that was not masked. In total, a replica includes the masked VDB which is a subset of the original data along with the remaining dataset. This replica is sent to the non-production system 130.

The replicated masked VDB is denoted in non-production system 130 as VDB replica 132.

In step 134, a master non-production VDB is created form the VDB replica 132, and denoted as DB-A "golden copy" 136. Golden copy is the master non-production VDB that is provisioned initially based on the replica received from the production system 110. All subsequent VDBs provisioned for different use cases are based on the master non-production VDB, hence it is called a golden copy.

Step 138 customizes the master non-production VDB. Any customizations such as, e.g., generic account configurations that are applicable across non-production VDBs provisioned from the golden copy are applied.

In step 140, non-production VDB instances 142 are generated from the master non-production VDB 136 for each non-production purpose, e.g., one for development purposes, one for testing purposes (system integration, performance, etc.).

Figure 2A:
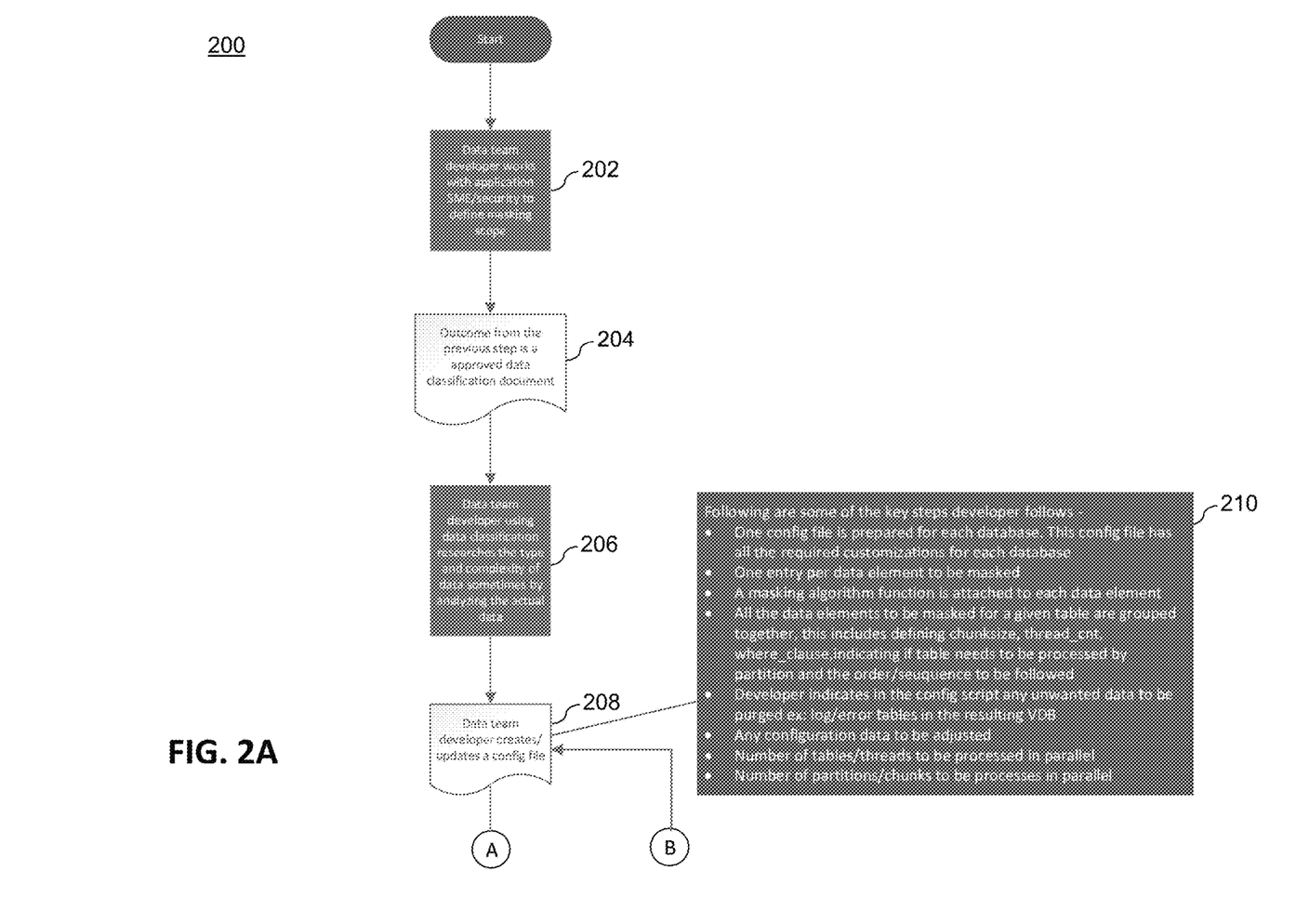
FIGS. 2A and 2B depict a process flow for an information processing system, according to an illustrative embodiment.
Figure 2B:
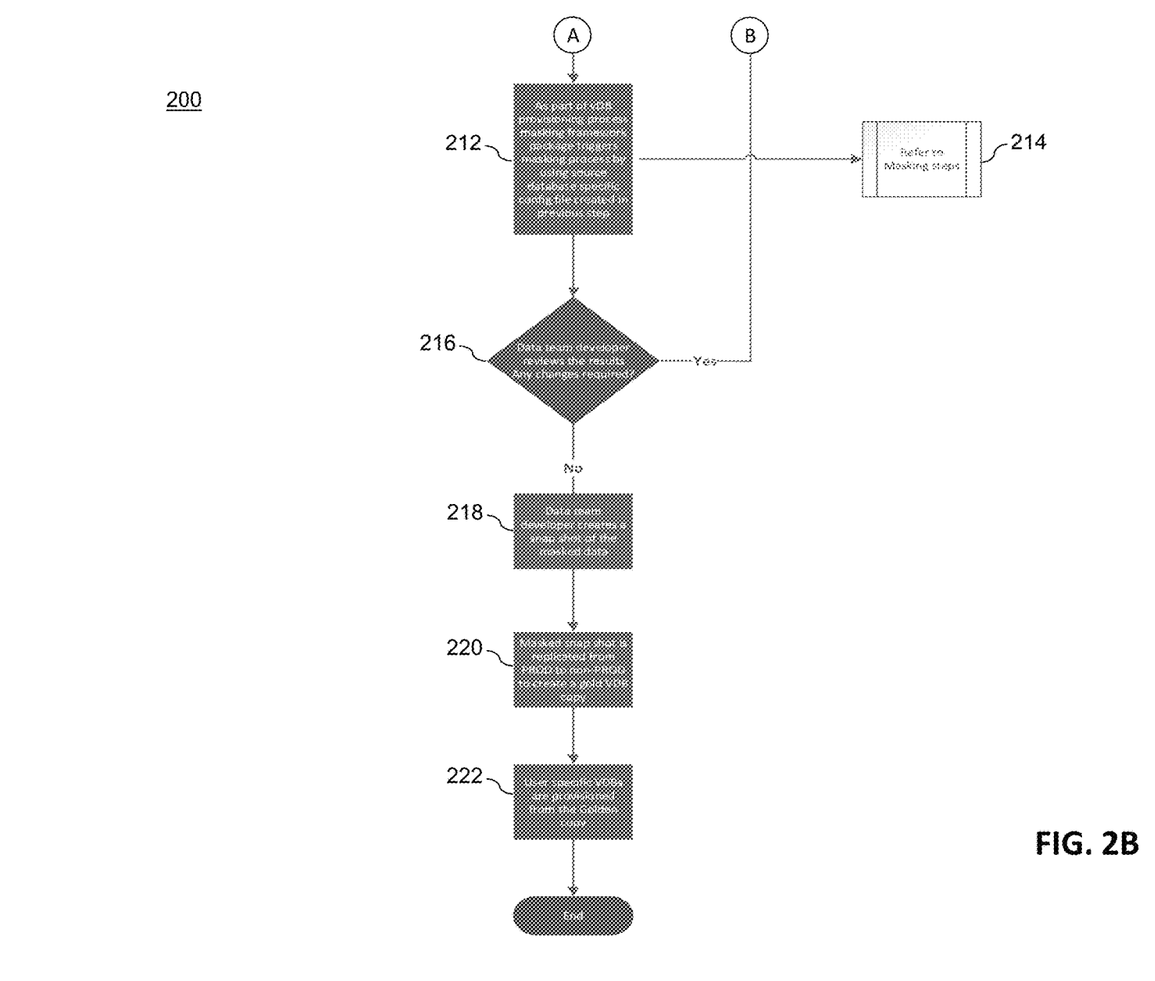

Turning now to FIGS. 2A and 2B, a process flow for an information processing system is depicted, according to an illustrative embodiment. For example, process flow 200 can be implemented in information processing system 100 of FIG. 1. More particularly, in the process flow 200, a configuration (config) file is created by a developer based on a database type and a masking scope. Based on the database type, respective framework scripts get deployed and perform masking operations (as will be described below in the context of FIGS. 3A through 3D) using the config file as input.

Step 202: Data team developer works with application subject matter expert (SME)/security to define masking scope.

Step 204: Outcome from the previous step is an approved data classification document.

Step 206: Data team developer using data classification researches the type and complexity of data by (in scenarios if needed) analyzing the actual data.

Step 208: Data team developer creates/updates a configuration (config) file.

Step 210: The following are some of the (exemplary) key steps/policies the developer follows in creating/updating a config file:

(i) One config file is prepared for each database (data set). This config file has all the required customizations for each database;
(ii) One entry per data element to be masked;
(iii) A masking algorithm function is attached to each data element;
(iv) All the data elements to be masked for a given table are grouped together, this includes defining chunksize, thread_cnt, where_clause, indicating if a table needs to be processed by partition and the order/sequence to be followed;
(v) Developer indicates in the config script any unwanted data to be purged, e.g., log/error tables in the resulting VDB;
(vi) Any configuration data to be adjusted;
(vii) Number of tables/thread to be processed in parallel; and/or
(viii) Number of partitions/chunks to be processed in parallel.

Step 212: As part of VDB provisioning process, masking framework package triggers masking process by using source database specific config file created in previous step.

Step 214: Refer to masking steps (FIGS. 3A through 3D).

Step 216: Data team developer reviews the masking results. Any changes required? If yes, return to step 208; otherwise go to next step.

Step 218: Data team developer creates a snapshot of the masked data.

Step 220: Masked snapshot is replicated from PROD (production system 110) to non-PROD (non-production system 130) to create a gold VDB copy.

Step 222: User specific VDBs are provisioned from the golden copy.

FIGS. 3A through 3D depict a data masking process, according to an illustrative embodiment. For example, data masking process 300 can be implemented in step 122 of FIG. 1 and step 214 of FIG. 2B. The term "framework" here refers to the system performing at least data masking operations.

Figure 3A:
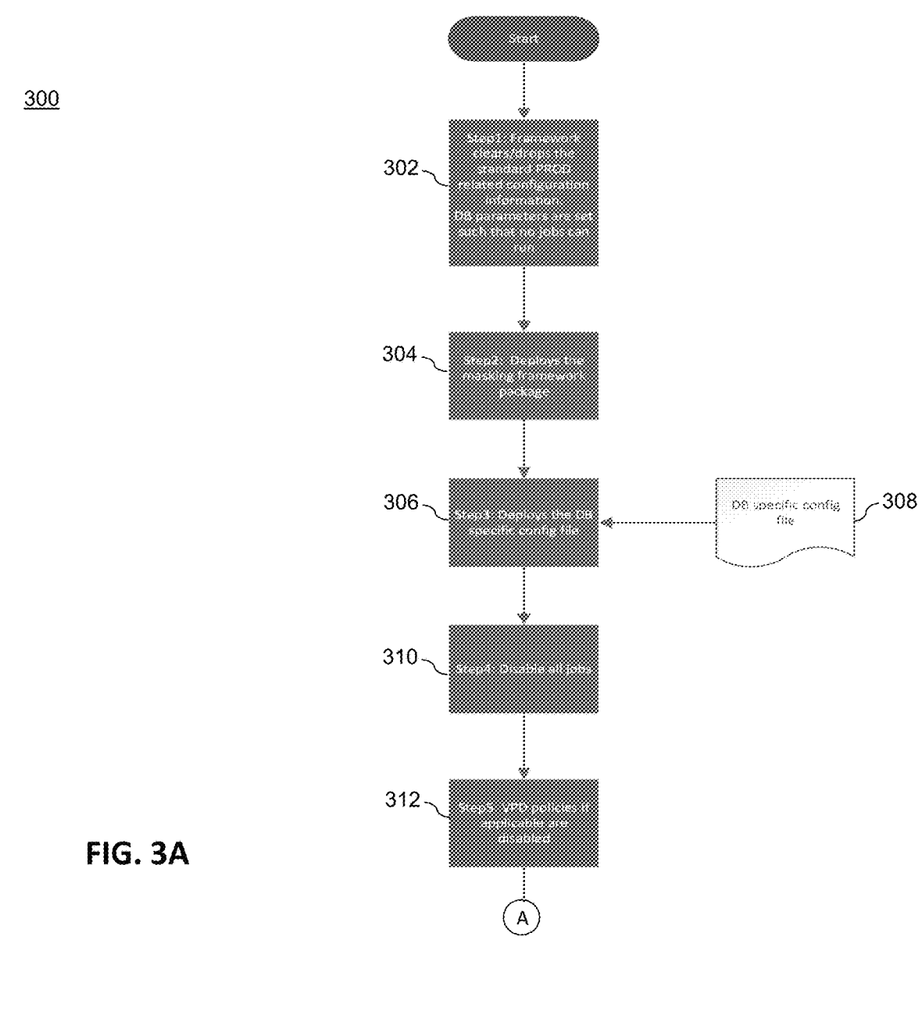
FIGS. 3A through 3D depict a data masking process for an information processing system, according to an illustrative embodiment.

Step 302 (step 1): Framework clears/drops the standard PROD related configuration information. Database (DB) parameters are set such that no jobs can run.

Step 304 (step 2): Deploys the masking framework package.

Step 306 (step 3): Deploys the DB specific config file 308.

Step 310 (step 4): Disable all jobs.

Step 312 (step 5): VPD policies if applicable are disabled.

Figure 3B:
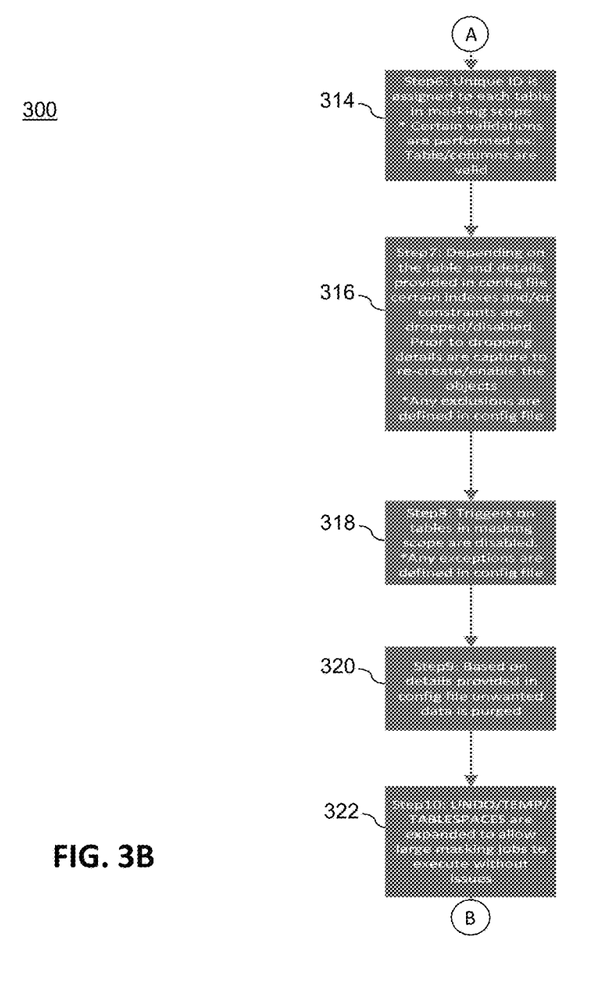

Step 314 (step 6): Unique identifier (ID) is assigned to each table in masking scope. Validations are performed, e.g., confirm table/columns are valid.

Step 316 (step 7): Depending on the table and details provided in the config file, certain indexes and/or constraints are dropped/disabled. Prior to dropping, details are captured to re-create/enable the objects. Any exclusions are defined in the config file.

Step 318 (step 8): Triggers on tables in masking scope are disabled. Any exceptions are defined in the config file.

Figure 3C:
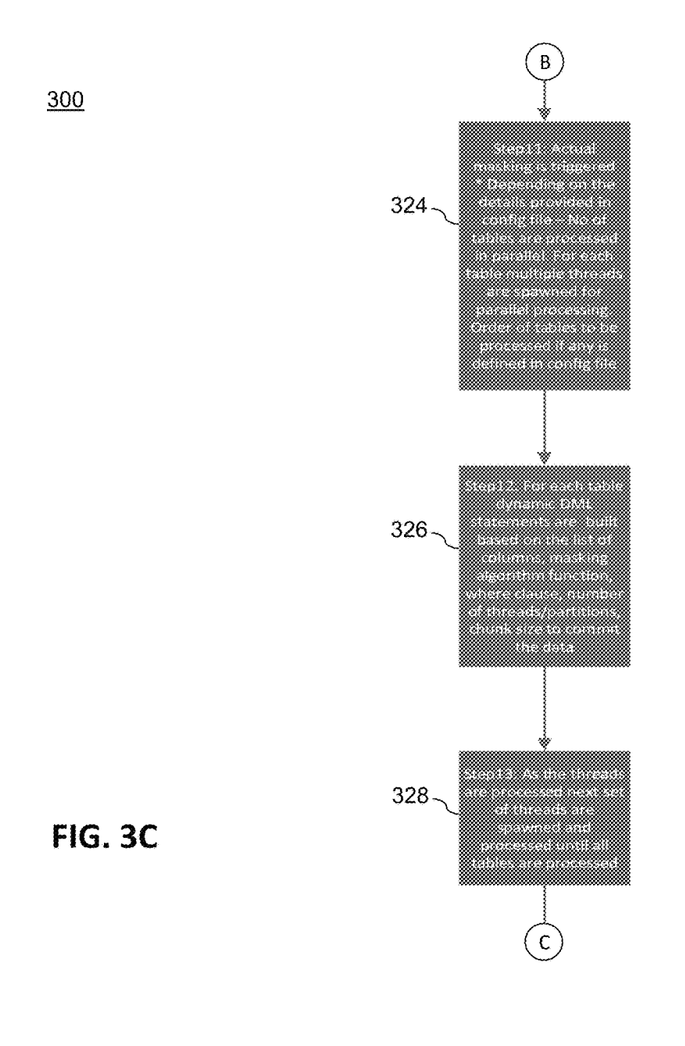

Step 320 (step 9): Based on details provided in the config file, unwanted data is purged.

Step 322 (step 10): UNDO/TEMP/TABLESPACES are expanded to allow large masking jobs to execute without issues.

Step 324 (step 11): Actual masking is triggered. Depending on the details provided in the config file, a number of tables are processed in parallel. For each table, multiple threads are spawned for parallel processing. The order of tables to be processed if any is defined in the config file.

Step 326 (step 12): For each table dynamic, data manipulation language (DML) statements are built based on the list of columns, masking algorithm function, where clause, number or threads/partitions, chunk size to commit the data.

Figure 3D:
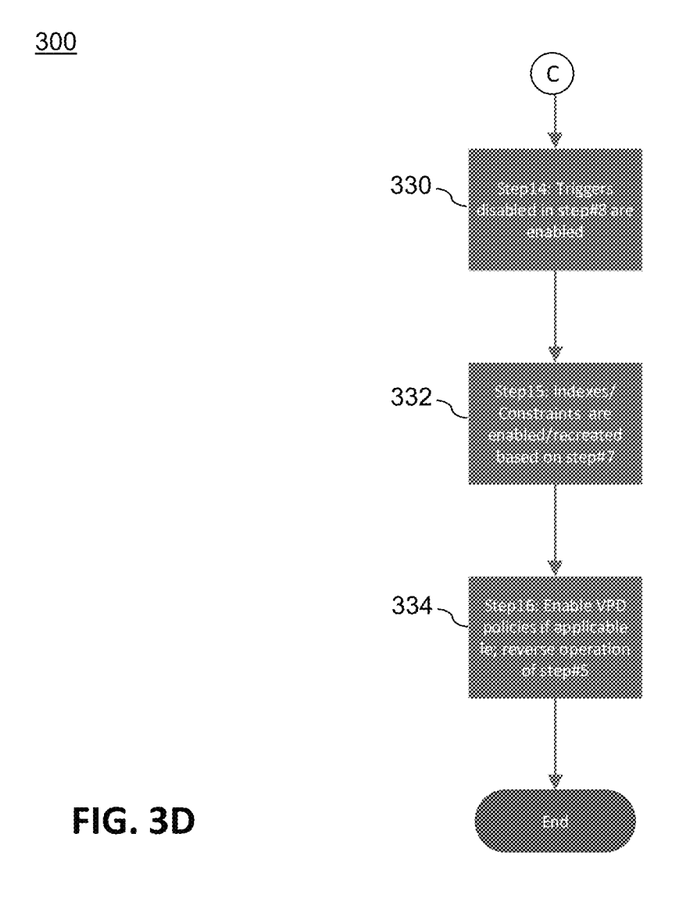

Step 328 (step 13): As the threads are processed, the next set of threads are spawned and processed until all tables are processed.

Step 330 (step 14): Triggers disabled in step 8 are enabled.

Step 332 (step 15): Indexes/Constraints are enabled/recreated based on step 7.

Step 334 (step 16): Enable VPD policies if applicable, i.e., reverse operation of step 5.

Figure 4:
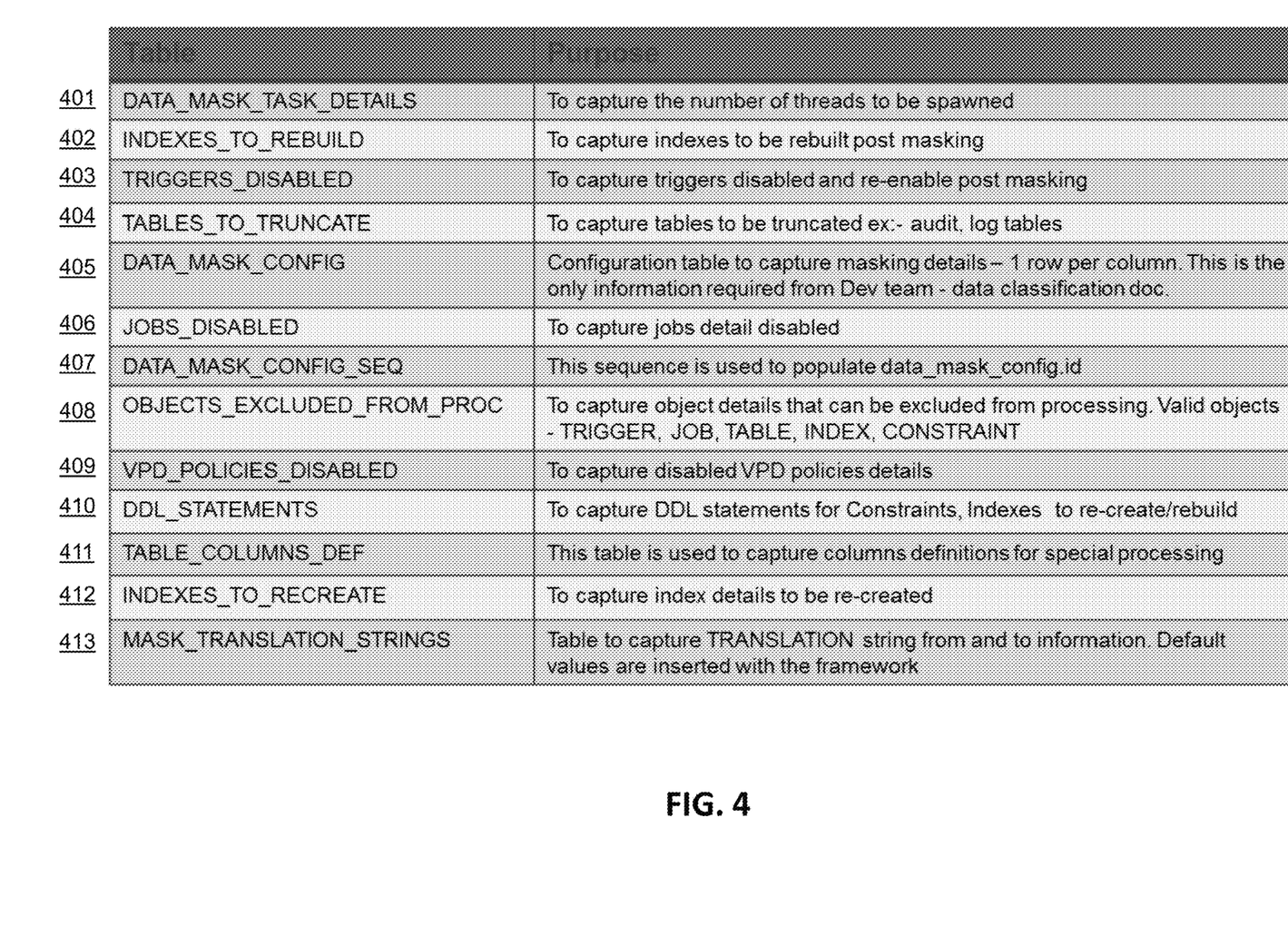
FIG. 4 depicts a table defining data structures used to capture the scope of data masking for an information processing system, according to an illustrative embodiment.

FIG. 4 depicts a table 400 defining data structures (e.g., tables, objects, sequences, etc.) used to capture the scope of data masking, according to an embodiment of the invention. More particularly, the data structures described in FIG. 4 are deployed as part of data masking operations 300 in FIGS. 3A through 3E, i.e., these data structures are part of the masking framework.

DATA_MASK_TASK_DETAILS (401) is a data structure configured to capture the number of threads to be spawned.

INDEXES_TO_REBUILD (402) is a data structure configured to capture indexes to be rebuilt post masking.

TRIGGERS_DISABLED (403) is a data structure configured to capture triggers disabled and re-enabled post masking.

TABLES_TO_TRUNCATE (404) is a data structure configured to capture tables to be truncated, e.g., audit, log tables.

DATA_MASK_CONFIG (405) is a configuration table configured to capture masking details—1 row per column. This is the only information required from the development team—data classification doc.

JOBS_DISABLED (406) is a data structure configured to capture jobs details disabled.

DATA_MASK_CONFIG_SEQ (407) is a sequence used to populate data_mask_config.id.

OBJECTS_EXCLUDED_FROM_PROC (408) is a data structure configured to capture object details that can be excluded from processing. Valid objects: TRIGGER, JOB, TABLE, INDEX, CONSTRAINT.

VPD_POLICIES_DISABLED (409) is a data structure configured to capture disabled VPD policies details.

DDL_STATEMENTS (410) is a data structure configured to capture DDL statements for Constraints, Indexes to re-create/rebuild.

TABLE_COLUMNS_DEF (411) is a data structure configured to capture columns definitions for special processing.

INDEXES_TO_RECREATE (412) is a data structure configured to capture index details to be re-created.

MASK_TRANSLATION_STRINGS (413) is a data structure configured to capture TRANSLATION string from and to information. Default values are inserted within the framework.

Figure 5:
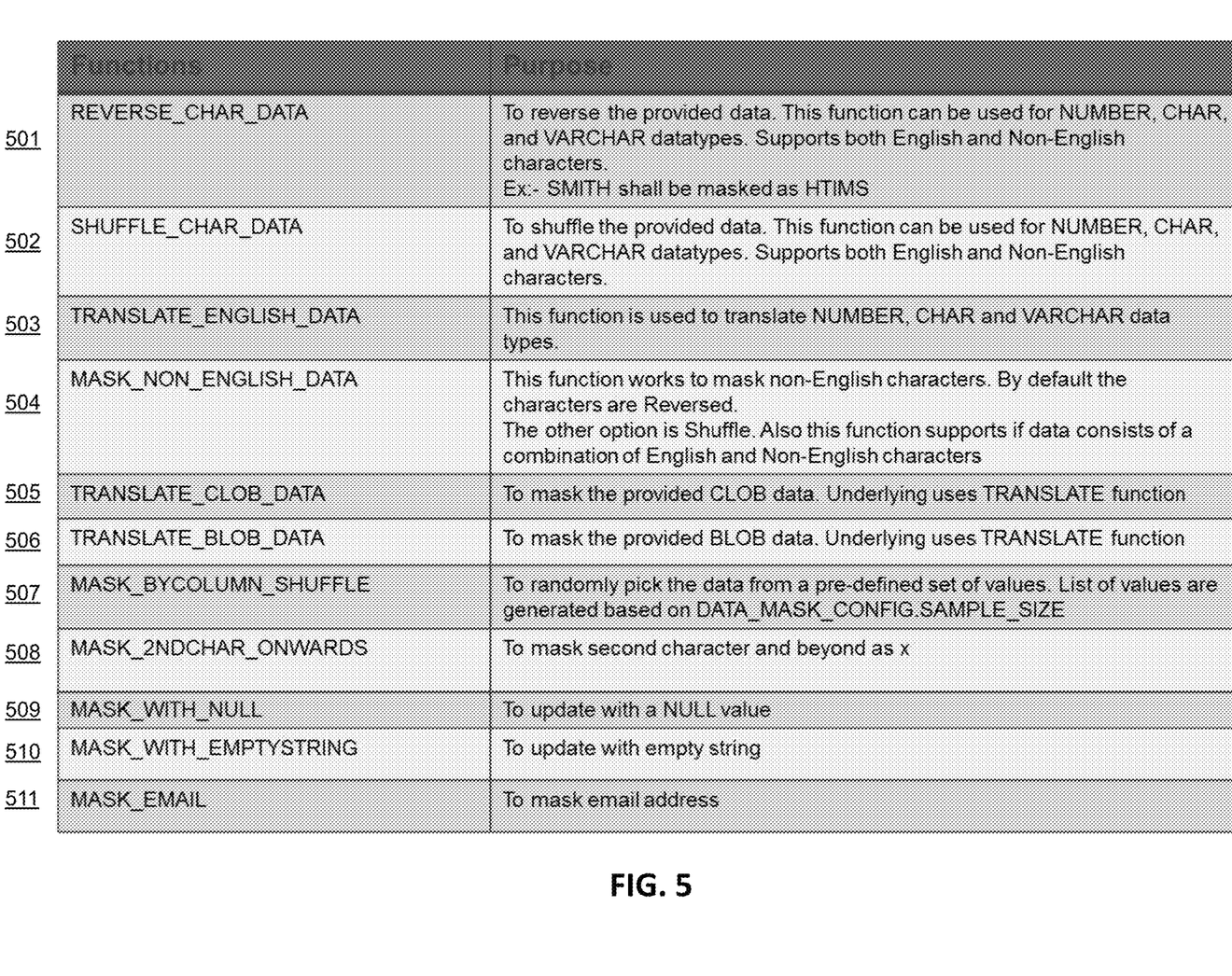
FIG. 5 depicts a table defining functions for data masking for an information processing system, according to an illustrative embodiment.

FIG. 5 depicts a table 500 defining functions for data masking, according to an embodiment of the invention. The masking functions described in FIG. 5 are deployed as part of data masking operations 300 in FIGS. 3A through 3D, i.e., these functions are algorithms that are attached to the data elements to be masked in a config file.

REVERSE_CHAR_DATA (501) is a function configured to reverse the provided data.

This function can be used for NUMBER, CHAR, and VARCHAR datatypes, and supports both English and Non-English characters, e.g., SMITH shall be masked as HTIMS.

SHUFFLE_CHAR_DATA (502) is a function configured to shuffle the provided data. This function can be used for NUMBER, CHAR, and VARCHAR datatypes, and supports both English and Non-English characters.

TRANSLATE_ENGLISH_DATA (503) is a function configured to translate NUMBER, CHAR and VARCHAR data types.

MASK_NON_ENGLISH_DATA (504) is a function configured to mask non-English characters, e.g., by default, the characters are Reversed. The other option is Shuffle. Also, this function supports data that consists of a combination of English and Non-English characters.

TRANSLATE_CLOB_DATA (505) is a function configured to mask the provided CLOB data. Underlying uses TRANSLATE function.

TRANSLATE_BLOB_DATA (506) is a function configured to mask the provided BLOB data. Underlying uses TRANSLATE function.

MASK_BYCOLUMN_SHUFFLE (507) is a function to randomly pick the data from a pre-defined set of values. The list of values is generated based on DATA_MASK_CONFIG.SAMPLE_SIZE.

MASK_2NDCHAR_ONWARDS (508) is a function configured to mask a second character and beyond as x.

MASK_WITH_NULL (509) is a function configured to update with a NULL value.

MASK_WITH_EMPTYSTRING (510) is a function configured to update with an empty string.

MASK_EMAIL (511) is a function configured to mask an email address.

The particular processing operations and other system functionality described in conjunction with FIGS. 1-5 are presented by way of illustrative example only, and should not be construed as limiting the scope of the disclosure in any way. Alternative embodiments can use other types of processing operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

Figure 6:
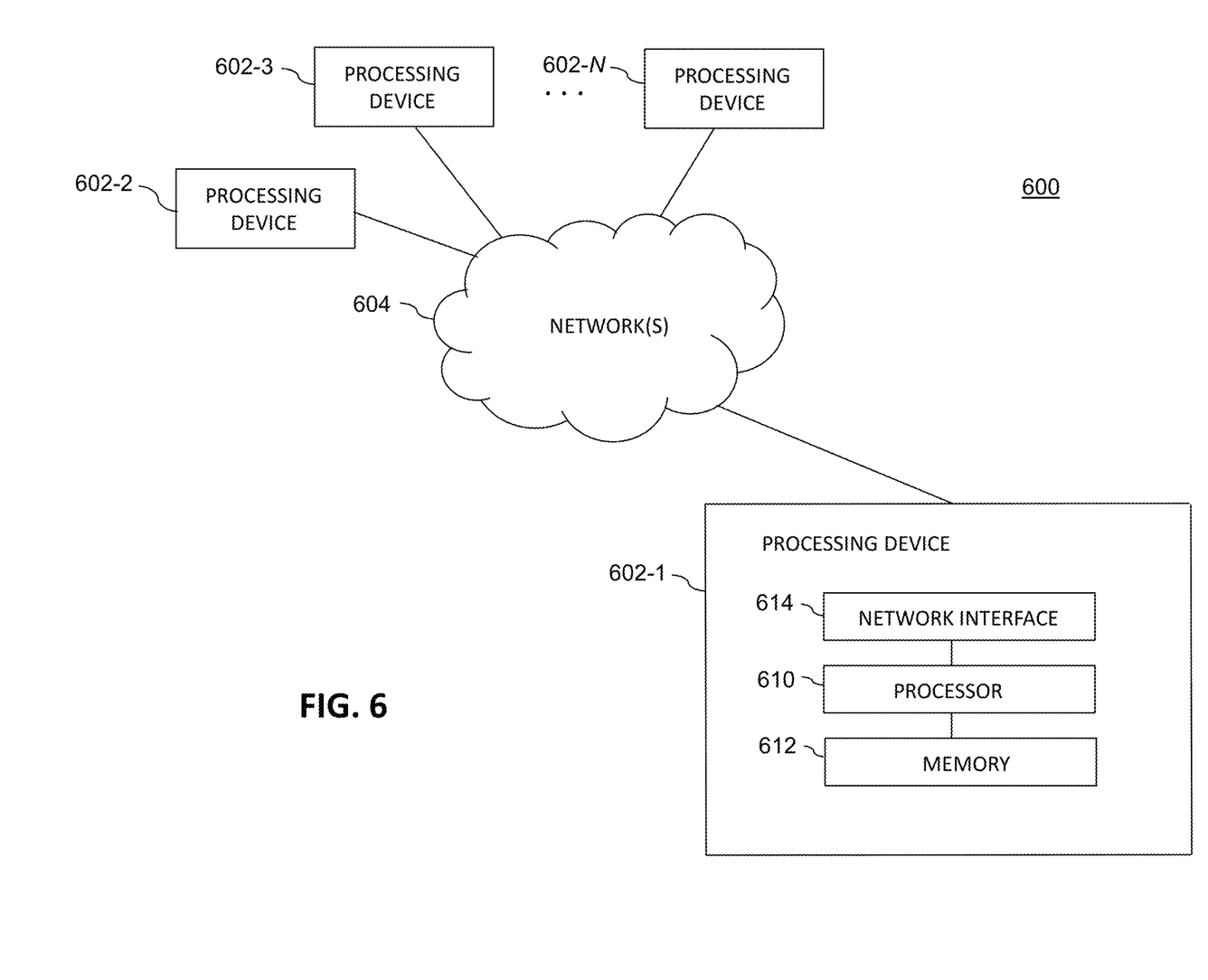
FIG. 6 illustrates a processing platform used to implement an information processing system with data masking, according to an illustrative embodiment.

FIG. 6 illustrates a processing platform used to implement an information processing system with data masking, according to an embodiment of the invention. More particularly, processing platform 600 is a processing platform on which a production system 110 and non-production system 130 with improved data masking functionalities (e.g., FIGS. 1-5 and otherwise described herein) can be implemented.

The processing platform 600 in this embodiment comprises a plurality of processing devices, denoted 602-1, 602-2, 602-3, . . . 602-N, which communicate with one another over network(s) 604. It is to be appreciated that the methodologies described herein may be executed in one such processing device 602, or executed in a distributed manner across two or more such processing devices 602. It is to be further appreciated that a server, a client device, a computing device or any other processing platform element may be viewed as an example of what is more generally referred to herein as a "processing device." As illustrated in FIG. 6, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architecture 100 of FIG. 1 can comprise one or more of such processing devices 602 shown in FIG. 6. The network(s) 604 represent one or more communications networks that enable components to communicate and to transfer data therebetween, as well as to perform other functionalities described herein.

The processing device 602-1 in the processing platform 600 comprises a processor 610 coupled to a memory 612. The processor 610 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 610. Memory 612 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 612 may comprise electronic memory such as random-access memory (RAM), read-only memory (ROM) or other types of memory, in any combination. The one or more software programs when executed by a processing device such as the processing device 602-1 causes the device to perform functions associated with one or more of the components/steps of system/methodologies in FIGS. 1-5. One skilled in the art would be readily able to implement such software given the teachings provided herein. Other examples of processor-readable storage media embodying embodiments of the invention may include, for example, optical or magnetic disks.

Processing device 602-1 also includes network interface circuitry 614, which is used to interface the device with the networks 604 and other system components. Such circuitry may comprise conventional transceivers of a type well known in the art.

The other processing devices 602 (602-2, 602-3, . . . 602-N) of the processing platform 600 are assumed to be configured in a manner similar to that shown for computing device 602-1 in the figure.

The processing platform 600 shown in FIG. 6 may comprise additional known components such as batch processing systems, parallel processing systems, physical machines, virtual machines, virtual switches, storage volumes, etc. Again, the particular processing platform shown in this figure is presented by way of example only, and the system shown as 600 in FIG. 6 may include additional or alternative processing platforms, as well as numerous distinct processing platforms in any combination.

Also, numerous other arrangements of servers, clients, computers, storage devices or other components are possible in processing platform 600. Such components can communicate with other elements of the processing platform 600 over any type of network, such as a wide area network (WAN), a local area network (LAN), a satellite network, a telephone or cable network, or various portions or combinations of these and other types of networks.

Furthermore, it is to be appreciated that the processing platform 600 of FIG. 6 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 600 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
generating a data masking configuration file for use in an information processing system comprising a production system operatively coupled to a non-production system, the data masking configuration file configured to mask at least a portion of a given data set of a data source;
wherein the generation of the data masking configuration file further comprises (i) grouping data elements of the given data set together based on a given data structure defined as part of a plurality of data structures, and (ii) attaching a masking algorithm function selected from a plurality of defined masking algorithm functions to each data element of the given data set to be masked;
wherein the data masking configuration file generating step is performed in accordance with a processing device comprising a processor operatively coupled to a memory.

2. The method of claim 1, wherein the plurality of data structures comprises a data structure configured to capture the number of data masking threads to be spawned.

3. The method of claim 1, wherein the plurality of data structures comprises a data structure configured to capture indexes to be rebuilt post data masking.

4. The method of claim 1, wherein the plurality of data structures comprises a data structure configured to capture triggers disabled and re-enabled post data masking.

5. The method of claim 1, wherein the plurality of data structures comprises a data structure configured to capture tables to be truncated for data masking.

6. The method of claim 1, wherein the plurality of data structures comprises a data structure configured to capture one or more processes disabled during data masking.

7. The method of claim 1, wherein the plurality of data structures comprises a data structure configured to capture a data masking sequence.

8. The method of claim 1, wherein the plurality of data structures comprises a data structure configured to capture one or more objects to be excluded from data masking.

9. The method of claim 1, wherein the plurality of defined masking algorithm functions comprise a function configured to reverse data elements in the data set.

10. The method of claim 1, wherein the plurality of defined masking algorithm functions comprise a function configured to shuffle data elements in the data set.

11. The method of claim 1, wherein the plurality of defined masking algorithm functions comprise a function configured to translate data element types.

12. The method of claim 1, wherein the plurality of defined masking algorithm functions comprise a function configured to mask data elements that are not of a specific language.

13. The method of claim 1, further comprising applying the data masking configuration file in the production system of the information processing system to mask at least a portion of a production data set to generate a masked production data set.

14. The method of claim 13, further comprising generating a replica of the masked production data set.

15. The method of claim 14, further comprising sending the replica of the masked production data set to the non-production system of the information processing system to enable the non-production system to utilize the masked production data set for one or more non-production purposes.

16. An information processing system, comprising:
a production system for online processing of a given data set operatively coupled to a non-production system for offline processing of the given data set; and
a data masking framework comprising a processor operatively coupled to a memory and configured to:
load a data masking configuration file for use in masking at least a portion of the given data set of a data source, wherein the data masking configuration file further comprises a masking algorithm function selected from a plurality of defined masking algorithm functions attached to each data element of the given data set; and
mask at least a portion of the given data set in accordance with the defined masking algorithm functions attached to each data element to generate a masked production data set, the data elements of the given data set being grouped together based on a given data structure defined as part of a plurality of data structures.

17. The system of claim 16, wherein the processor is further configured to generate a replica of the masked production data set.

18. The system of claim 17, wherein the processor is further configured to send the replica of the masked production data set from the production system to the non-production system to enable the non-production system to utilize the masked production data set for one or more non-production purposes.

19. An article of manufacture comprising a non-transitory processor-readable storage medium having stored therein program code of one or more software programs, wherein the program code when executed by at least one processing device causes said at least one processing device to perform steps of:
generating a data masking configuration file for use in an information processing system comprising a production system operatively coupled to a non-production system, the data masking configuration file configured to mask at least a portion of a given data set of a data source;
wherein the generation of the data masking configuration file further comprises (i) grouping data elements of the given data set together based on a given data structure defined as part of a plurality of data structures, and (ii) attaching a masking algorithm function selected from a plurality of defined masking algorithm functions to each data element of the given data set to be masked.

20. The article of manufacture of claim 19, wherein the program code when executed by at least one processing device further causes said at least one processing device to perform the step of applying the data masking configuration file in the production system of the information processing system to mask at least a portion of a production data set to generate a masked production data set.

* * * * *